March 4, 1930.  J. R. OISHEI  1,749,441
WINDSHIELD CLEANER MOUNTING
Filed Dec. 13, 1926  2 Sheets-Sheet 1
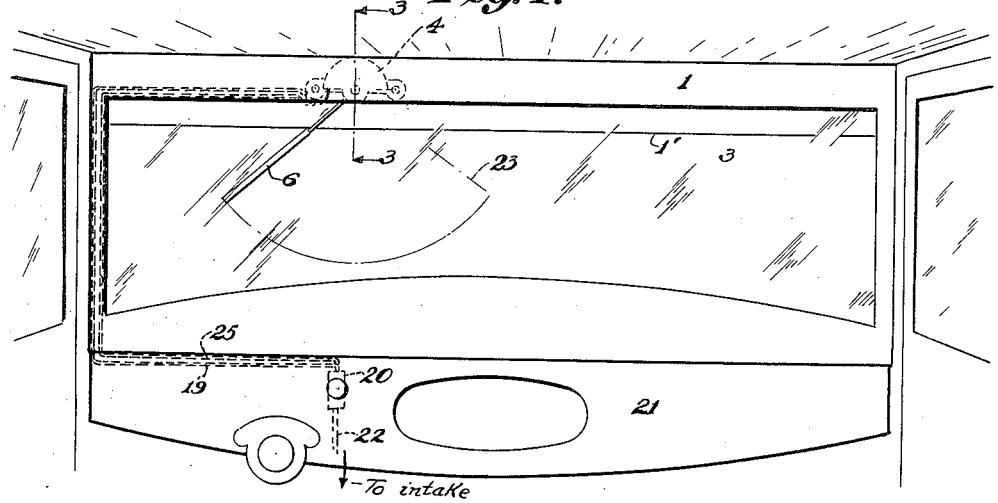
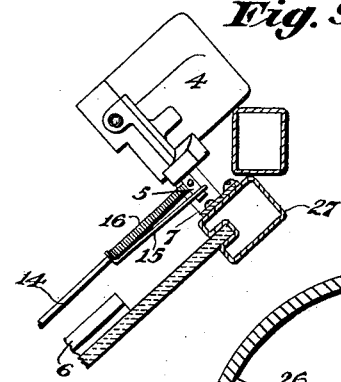
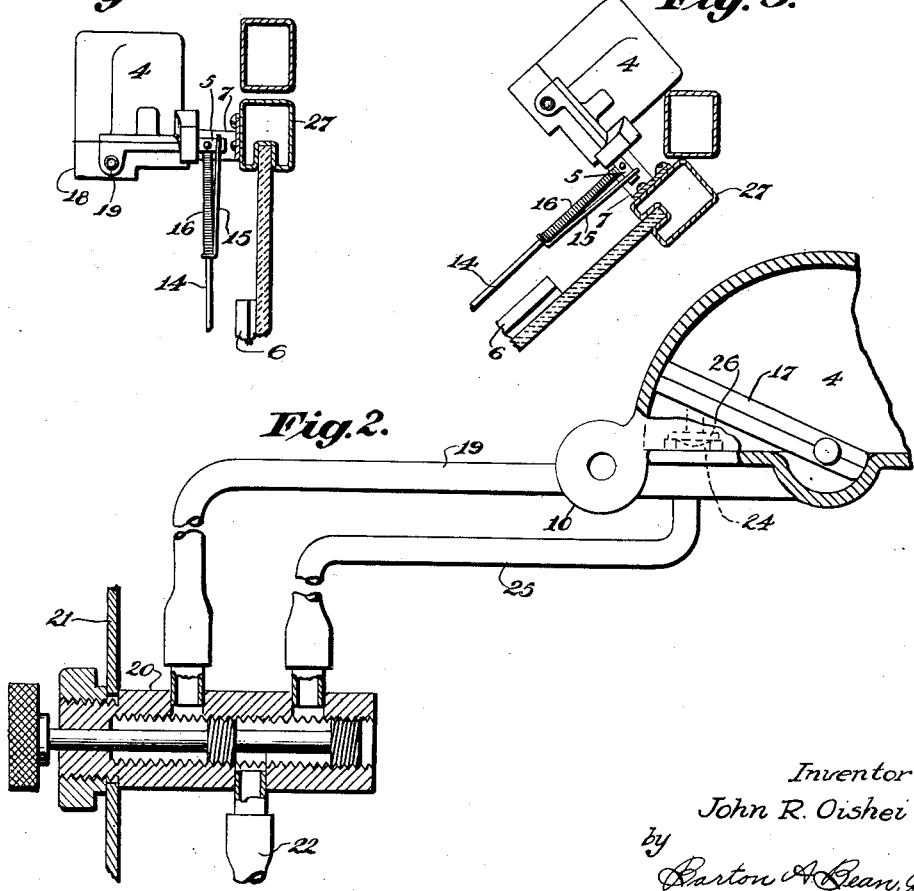
Inventor
John R. Oishei
by
Barton A. Bean, Jr.
Atty.

March 4, 1930. J. R. OISHEI 1,749,441
WINDSHIELD CLEANER MOUNTING
Filed Dec. 13, 1926    2 Sheets-Sheet 2
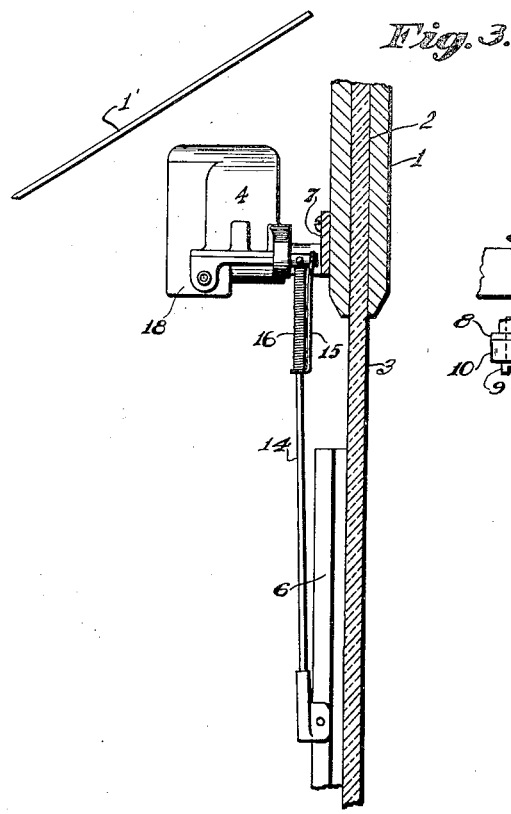
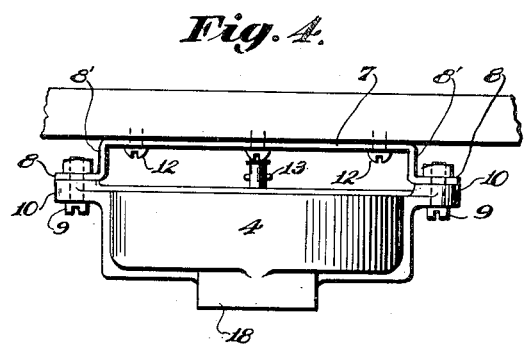
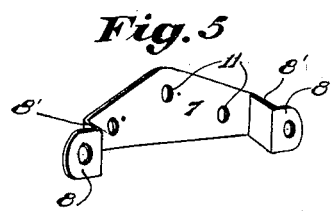
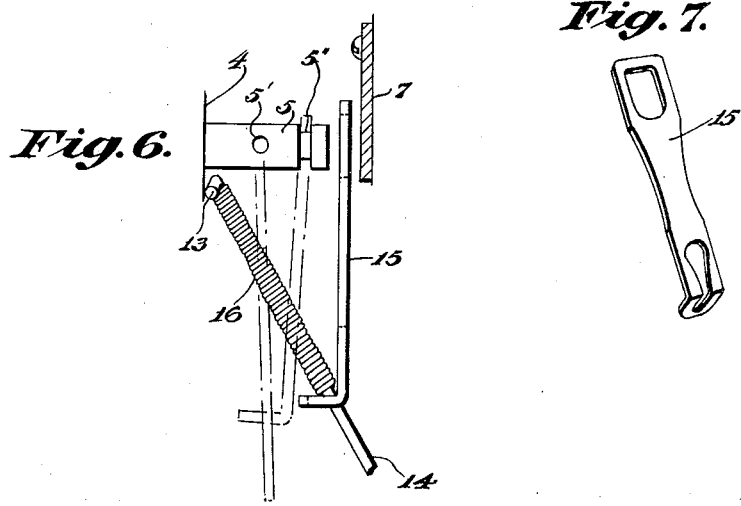
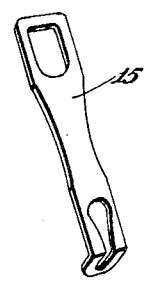
Inventor
John R. Oishei
by Barton A. Bean, Jr.
Atty.

Patented Mar. 4, 1930

1,749,441

UNITED STATES PATENT OFFICE

JOHN R. OISHEI, OF BUFFALO, NEW YORK, ASSIGNOR TO TRICO PRODUCTS CORPORATION, OF BUFFALO, NEW YORK

WINDSHIELD-CLEANER MOUNTING

Application filed December 13, 1926. Serial No. 154,479.

This invention relates to automatic windshield cleaners and it has particular reference to the installation of the oscillatory type of cleaner upon the exterior or forward side of an automobile windshield.

Heretofore, the practice has been to install the motor of the automatic cleaner upon the inner side of the windshield and to project its wiper operating shaft over the upper frame bar, or through the latter, for supporting on its forwardly protruding end the usual wiper element. With such a mounting of the cleaner on the top frame bar of a windshield which opens forwardly about a horizontal axis, the motor would be swung downwardly into the field of vision and tend to obstruct a clear view. It has also been customary to attach the cleaner motor on the outside of the windshield frame and extend the operating shaft through the latter to the interior of the motor vehicle, where it will be accessible to the driver. As an improvement on the swinging style of windshield, a windshield construction has been devised wherein the windshield frame is stationary and the transparency or glass is slidably mounted therein in a vertical manner. In this latter type it is not advisable to project the shaft through the windshield frame because the shaft would interfere with the vertical adjustment of the glass.

It is therefore the aim of the present invention to provide a windshield cleaner of the automatic type which may be readily installed upon the exterior of the windshield, so as to permit the vertical adjustment of the glass in the sliding style of windshield and so that the cleaner motor will be elevated from the field of vision rather than lowered thereinto when the glass is opened forwardly in the swinging type of windshield.

The objects of the invention are to provide an automatic cleaner which may be readily installed and mounted upon the exterior or forward side of a windshield in such a manner as to permit ready adjustment of the windshield transparency; to mount the cleaner motor spaced forwardly from the windshield and to extend its wiper operating shaft rearwardly toward the windshield but in spaced relation thereto to permit free rocking movement thereof; to provide an oscillatory type of windshield cleaner in which the motor shaft extends substantially at right angles to the windshield in forwardly spaced relation thereto, with the wiper element attached to the shaft at a point between the motor and windshield; to provide an improved mounting for such an arranged automatic cleaner which will engage or house the wiper operating shaft and its connection with the wiper element; to provide an automatic cleaner in which the wiper element faces away from the motor and toward the exterior surface of the windshield glass; and to provide in combination with the windshield an exteriorly arranged automatic cleaner having a remote, combined operating and parking control which may be disposed in a position readily accessible to the operator of the car or vehicle.

In the drawings,

Fig. 1 is an interior view of a motor vehicle equipped with a windshield cleaner embodying the present invention looking forward through the windshield, as from the driver's seat.

Fig. 2 is a schematic view showing more particularly the combined operating and parking control, and its relation to the motor of the automatic cleaner.

Fig. 3 is a vertical section about on line 3—3 of Fig. 1.

Fig. 4 is a top plan view of the motor, showing the same in position on the windshield frame.

Fig. 5 is a perspective view showing a simple bracket construction for mounting the cleaner motor on the windshield frame.

Fig. 6 is an enlarged detail view disclosing the method of attaching the wiper arm when the motor is in position on the windshield.

Fig. 7 is a perspective of the stirrup utilized in connecting the wiper arm to the motor shaft.

Fig. 8 is a fragmentary view showing an automatic cleaner mounted on a windshield of the forwardly swinging type, the windshield panel being in closed position.

Fig. 9 is a similar view showing the windshield panel in open position.

Referring more in detail to the accompanying drawings, the numeral 1 designates the top frame member of a windshield of the vertically slidable type, the same having a slot or pocket 2 in which the pane of glass 3 is slidable for the purpose of ventilation. In this style of windshield there is usually provided some mechanism (not shown) by which the glass may be vertically adjusted. Consequently, the upper edge of the glass must have an unobstructed path of travel, and because of this requirement it is not feasible or advisable to have any portion of the windshield cleaner, or its mounting, extend into the path of movement of the glass.

In accordance with the present invention the windshield cleaner motor 4 is supported off or spaced forwardly from the forward face of the windshield beneath the visor 1', and its operating shaft 5 is extended rearwardly from the motor toward the windshield terminating short thereof, whereby to permit a free pivoting or rocking of the shaft for sweeping the wiper element 6 across the underlying glass 3. Suitable means are provided for so disposing and arranging the cleaner motor, and also to encage or enclose the rearwardly projecting shaft 5. A simple embodiment of this means is shown as consisting of a bracket, struck out from sheet metal stock and shaped to provide a body portion 7; and offset terminals 8 connected to the body by substantially parallel arms 8', the offset terminals being perforated and adapted to receive the bolts 9 which penetrate the spaced mounting parts or ears 10 of the motor casing for securely connecting the motor to the bracket. The body portion 7 is provided with a suitable number of apertures 11 through which suitable fasteners 12 are passed for anchoring the bracket securely to the front face of the upper frame member 1 of the windshield. The fastening elements 12 are of such a character as not to project into the path of movement of the windshield glass within the pocket 2.

The wiper element is readily mounted or connected to the operating shaft 5 without removing the motor from its mounting and without the use of tools, in the embodiment of the invention shown the shaft being provided with a transverse, normally horizontal opening 5', in which the bent end 13 of the wiper arm 14 is engaged, and a groove or seat 5" disposed between the transverse opening 5' and the outer end of the shaft. A stirrup 15 is hung over the shaft from the groove 5" and has its lower end engaged about the wiper arm 14 beneath a compressed spring 16, whereby the combined action of the stirrup and spring will be to swing the lower end of the arm, which supports the wiper element 6, in a plane lengthwise of the shaft and away from the motor toward the windshield glass. By removing the upper end of the stirrup from the shaft 5, the tension of the spring is relieved and the upper end of the wiper arm may readily be disengaged by a movement laterally thereof and without the use of any tools whatever. This is especially advantageous in such a small or crowded space as is provided by this mounting, since it is not desirable to support the motor any farther from the windshield than is necessary because of the weight of the motor. By this arrangement the wiper element faces away from the motor and therefore the pressure of the wiper on the glass will tend to lift up on the motor and thereby assist the bracket in supporting the motor and tend to hold the latter against vibration. The connection between the wiper arm and the operating shaft is housed or enclosed by the forwardly extending arms 8' of the mounting bracket.

It will be noted that the automatic cleaner motor, with all of its immediately related parts, is disposed exteriorly of the automobile and it is therefore desirable to provide a remote control for the same which is readily accessible to the operator of the vehicle. In the present disclosure the motor of the automatic windshield cleaner is of the fluid pressure or so called suction operated type, the same comprising an oscillating vane or piston 17 which rocks the shaft 5 upon the operative applications of fluid pressure alternately to the opposite sides of the piston. Such operative applications of fluid pressure are obtained through an automatic valve mechanism (not shown) enclosed within the valve chamber 18, and this valve mechanism is connected by a conduit 19 to a control valve 20 arranged on the instrument board 21 of the vehicle. This valve is in turn connected to a source of operating pressure, such as the intake manifold of the vehicle engine, by a conduit 22. Thus by the proper manipulation of the valve 20 the fluid pressure may be switched on and off, as desired, so that the wiper element will be oscillated over a prescribed zone, as indicated at 23, on the windshield glass. When the valve 20 interrupts the communication with the source of operating pressure or suction, the wiper element will come to rest, but it is difficult for the operator to bring the wiper element to a stop at either extreme limit of movement where it will be out of the line of vision of the operator. It is therefore desirable to have a control by which the wiper element may be parked or brought to rest at a desired point out of the field of vision, and such means are here shown as embodying a parking port 24 opening through one side of the motor casing 4 and connected to the valve 20 by a conduit 25 so that by the proper manipulation of the valve 20 the conduits 19 and 25 may be brought selectively into communication with the pressure conduit 22, and when the conduit 25 is in communication with the source of suction that side of the motor casing into which the port 24 opens will be in constant communication with the source of suction and the piston 17 will constantly be urged toward the port 24. The piston may be provided with a valve 26 to seal the port 24 so that the source of suction will normally act upon the sealing valve 26 alone.

This combined operating and parking control permits the operator from within the vehicle to start and control his automatic cleaner, which is exteriorly disposed, as well as to position or park the wiper element to one extreme limit of movement.

Figures 8 and 9 disclose the automatic cleaner motor as being exteriorly mounted upon the upper frame bar 27 of a windshield of the forwardly swinging type, the same being mounted to open about a horizontal axis extending substantially through the frame bar. When the windshield panel is swung forwardly to an open position, as in Fig. 9, it will be noted that the wiper motor is also swung upwardly away from the field of vision, as distinguished from the motor which is mounted on the inner side of the upper frame bar which is swung downwardly directly into the line of vision of the operator when the windshield is opened.

While the several details of construction have been described quite minutely in order to give a full and complete disclosure of the invention, it is not intended that the scope of protection should be limited thereby except as may be prescribed by the appended claims.

I claim:

1. In combination with a windshield motor having spaced mounting parts, a mounting member adapted to be secured to a windshield frame and being provided with spaced offsets matching said spaced mounting parts for attachment thereto, and means for connecting said offsets to said spaced mounting parts, said motor having a wiper operating shaft projecting into and terminating in the space between said offsets.

2. The combination with an automatic windshield cleaner comprising a motor having an operating shaft, a wiper, and a wiper actuating arm connected to the shaft; of a support for the motor connected thereto on opposite sides of said shaft and extending across the end of the latter in spaced relation thereto so as to encage the connection between the shaft and wiper actuating arm, said support adapted to be mounted on the windshield and holding the motor with its operating shaft projecting rearwardly toward but spaced from the windshield.

3. An automatic windshield cleaner comprising a motor having a projecting wiper operating shaft, means for mounting the motor on the exterior of a windshield with the shaft extending substantially at right angles to and toward the windshield, a wiper actuating arm pivoted to the shaft for swinging in a direction lengthwise of the shaft, a wiper element facing away from the motor and toward the windshield and connected to the arm, and means for urging the wiper element away from the motor and toward the windshield.

4. An automatic windshield cleaner comprising a motor having a projecting wiper operating shaft, means for mounting the motor on the front side of a windshield and extending across the end of the shaft in proximity thereto thereby to place the shaft in a position substantially inaccessible with tools, a wiper arm interlocked with the shaft, and quickly detachable means for detachably securing the interlock between the arm and the shaft consisting of a member adapted to be engaged over the shaft adjacent said mounting means by being passed between said mounting means and the shaft subsequent to the interlocking of the arm with the shaft.

5. A windshield cleaner comprising a projecting wiper-operating shaft having an arm-bearing disposed inwardly from the free end of said shaft, and a seat interposed between the arm-bearing and said free end, a wiper, a wiper carrying arm detachably engaged in the bearing, and a spring device for securing the arm in its bearing and having a part for being passed over the free end of the shaft, and engaged in said seat outwardly of said arm-bearing and under tension to hold the arm in the latter.

6. In combination, a windshield cleaner motor comprising a casing having a chamber and adapted to be mounted at the front side of the motor vehicle windshield in forwardly spaced relation thereto, means supporting the casing in such forwardly spaced relation on the windshield in opposition with the frame of said windshield to provide an enclosure space therebetween, a shaft extending into the casing chamber and from the casing rearwardly toward the windshield frame and terminating within the enclosure space, said shaft journalled in said casing and movable about an axis substantially perpendicular to the windshield whereby said casing serves to conceal said shaft to view from the front of the motor vehicle, a vane-type piston fixed on and extending upwardly from said shaft and within said casing chamber for operating therein in a zone above said shaft, and a wiper carrying arm connected to said shaft within the enclosure space and movable in a zone below said shaft.

JOHN R. OISHEI.

CERTIFICATE OF CORRECTION.

Patent No. 1,749,441.  Granted March 4, 1930, to

JOHN R. OISHEI.

It is hereby certified that error appears in the printed specification of the above numbered patent requiring correction as follows: Page 1, line 60, for the word "engage" read "encage"; and that the said Letters Patent should be read with this correction therein that the same may conform to the record of the case in the Patent Office.

Signed and sealed this 8th day of April, A. D. 1930.

(Seal)

M. J. Moore,
Acting Commissioner of Patents.